United States Patent
Mory

(10) Patent No.: US 7,010,036 B1
(45) Date of Patent: Mar. 7, 2006

(54) DESCRIPTOR FOR A VIDEO SEQUENCE AND IMAGE RETRIEVAL SYSTEM USING SAID DESCRIPTOR

(75) Inventor: Benoit Mory, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/494,670

(22) Filed: Jan. 31, 2000

(30) Foreign Application Priority Data

Feb. 1, 1999 (EP) .................................. 99400219

(51) Int. Cl.
*H04B 1/66* (2006.01)

(52) U.S. Cl. ..................... 375/240.08; 375/240.17; 375/240.16; 348/699; 382/236; 382/238

(58) Field of Classification Search ........... 375/240.08, 375/240, 240.16, 240.17; 348/352, 700, 348/699, 416, 407; 382/224, 173, 232, 236, 382/238
See application file for complete search history.

(56) References Cited

U.S. PATENT DOCUMENTS

| | | | | |
|---|---|---|---|---|
| 5,267,034 A | * | 11/1993 | Miyatake et al. | 348/352 |
| 5,809,202 A | * | 9/1998 | Gotoh et al. | 348/207 |
| 5,929,940 A | * | 7/1999 | Jeannin | 348/699 |
| 6,078,618 A | * | 6/2000 | Yokoyama et al. | 375/240 |
| 6,195,458 B1 | * | 2/2001 | Warnick et al. | 382/173 |
| 6,295,376 B1 | * | 9/2001 | Nakaya | 382/236 |
| 6,389,168 B1 | * | 5/2002 | Altunbasak et al. | 382/224 |
| 6,456,660 B1 | * | 9/2002 | Yokoyama | 375/240.16 |

OTHER PUBLICATIONS

Ahanger et al., Video Query Formulation, Feb. 1995, SPIE Proceedings series, fig. 1, sections 3-5.*
Ahanger et al. ☐☐☐☐Note: Previously cited.*

* cited by examiner

*Primary Examiner*—Shawn S. An

(57) ABSTRACT

The present invention relates to a descriptor for the representation, from a video indexing viewpoint, of motions of a camera or any kind of observer or observing device within any sequence of frames in a video scene. The motions are at least one or several of the following basic operations: fixed, panning (horizontal rotation), tracking (horizontal transverse movement) tilting (vertical rotation), booming (vertical transverse movement), zooming (changes of the focal length), dollying (translation along the optical axis) and rolling (rotation around the optical axis), or any combination of at least two of these operations. Each of said motion types, except fixed, is oriented and subdivided into two components that stand for two different directions, and represented by means of an histogram in which the values correspond to a predefined size of displacement. The invention also relates to an image retrieval system in which a video indexing device uses said descriptor.

29 Claims, 5 Drawing Sheets

DESCRIPTOR FOR A VIDEO SEQUENCE AND IMAGE RETRIEVAL SYSTEM USING SAID DESCRIPTOR

FIELD OF THE INVENTION

The present invention relates to a descriptor for the representation, from a video indexing viewpoint, of motions of a camera or any kind of observer or observing device within any sequence of frames in a video scene, said motions being at least one or several of the following basic operations: fixed, panning (horizontal rotation), tracking (horizontal transverse movement, also called travelling in the film language), tilting (vertical rotation), booming (vertical transverse movement), zooming (changes of the focal length), dollying (translation along the optical axis) and rolling (rotation around the optical axis), or any combination of at least two of these operations. This invention may be used in a broad variety of applications among the ones targeted by the future standard MPEG-7.

BACKGROUND OF THE INVENTION

Archiving image and video information is a very important task in several application fields, such as television, road traffic, remote sensing, meteorology, medical imaging and so on. It remains hard, however, to identify information pertinent with respect to a given query or to efficiently browse large video files. The approach most commonly used with the databases consists in assigning keywords to each stored video and doing retrieval on the basis of these words.

Three standards have already been defined by MPEG: MPEG-1 for audio-visual sequence storage, MPEG-2 for audio-visual sequence broadcast, and MPEG-4 for object-based interactive multimedia applications. The future one, MPEG-7, will provide a solution to audiovisual information retrieval by specifying a standard set of descriptors that can be used to describe various types of multimedia information. MPEG-7 will also standardize ways to define other descriptors as well as structures (description schemes, i.e. ways for representing the information contained in a scene) for the descriptors and their relationships. Such descriptions will be associated with the contents themselves to allow fast and efficient searching for material of a user's interest (still pictures, graphics, 3D models, audio, speech, video, . . . ).

SUMMARY OF THE INVENTION

It is the object of the invention to propose a solution for the representation of a camera (or of any kind of observer or observing device) motion within any sequence of frames in a video scene.

To this end, the invention relates to a descriptor such as defined in the introductive part of the description and which is moreover characterized in that each of said motion types, except fixed, is oriented and subdivided into two components that stand for two different directions, and represented by means of an histogram in which the values correspond to a predefined size of displacement.

Although the efficiency also depends on the searching strategy involved in the database system, the effectiveness of this descriptor cannot be denied, since each motion component (all the possible motion parameters as well as the speeds involved, the precision on these movements speeds being preferably half a pixel per frame, which seems sufficient in all the possible applications) is described independently and precisely. Its simplicity and comprehensiveness allow a very wide amount of possible queries to be parameterized. The application domain is very large since the camera motion is a key feature for all the video content-based applications (query-retrieval systems, but also video surveillance, video edition, . . . ). Moreover, although the scalability in terms of amount of data is not really targeted by the proposed descriptor, said descriptor offers the possibility to be used inside a hierarchical scheme allowing to represent the camera motion in a wide range of temporal granularity.

BRIEF DESCRIPTION OF THE DRAWINGS

The present invention will now be described, by way of example, with reference to the accompanying drawings in which.

DETAILED DESCRIPTION OF THE INVENTION

Camera operations are very important from a video indexing viewpoint. Since objects motion and global motion are the key features that make the difference between still images and video, any indexing system based on the video content should include a way to efficiently represent motion in a wide sense. As far as the motion of the camera is concerned, it is clear that the part of the video in which camera is static and those in which the camera is travelling or panning do not share the same sense in terms of spatio-temporal content. Like any other discriminating feature, the global motion must be described and represented in the future MPEG-7 framework, if possible by addressing any type of video and any type of application in which the motion of the camera can be an issue. In video archives, adding a description of the global motion allows the users, either non-expert or professional, to perform queries that take into account the motion of the camera. Those queries, mixed with the description of other features, should permit to retrieve video shots according to information directly or semantically related to the camera motion.

Regular camera operations include the eight well-known basic operations generally defined (see FIGS. 1, 2 and 3), which are, as said hereinabove, fixed, panning, tracking, tilting, booming, zooming, dollying, and rolling, together with the numerous possible combinations of at least two of these operations. Fixed operation is common and does not need further explanation. Panning and tilting are often used, particularly when the camera center is fixed (on a tripod for instance), and allow the following of an object or the view of a large scene (a landscape or a skyscraper for instance). Zooming is often used to focus the attention on a particular part of a scene. Tracking and dollying are most of the times used to follow moving objects (e.g. travelling). Rolling is for instance the result of an acrobatic sequence shot from an airplane. All seven camera motion operations (fixed is straightforward) lead to different induced image points velocities, that can be automatically modeled and extracted.

Figure 1:
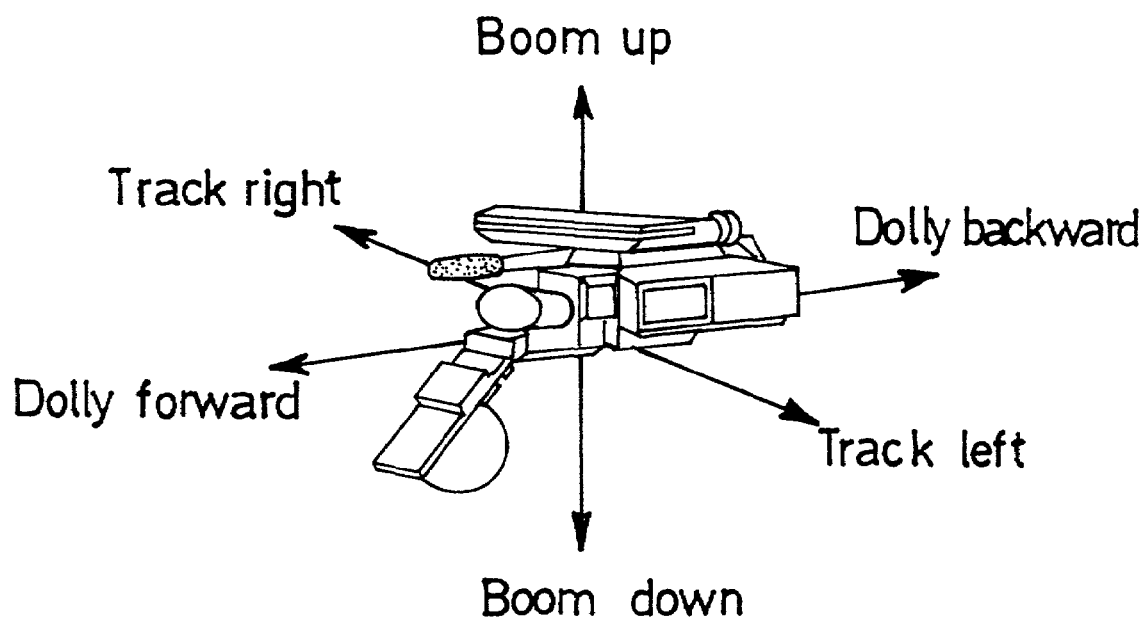
FIGS. 1 to 3 illustrate basic camera operations.
Figure 2:
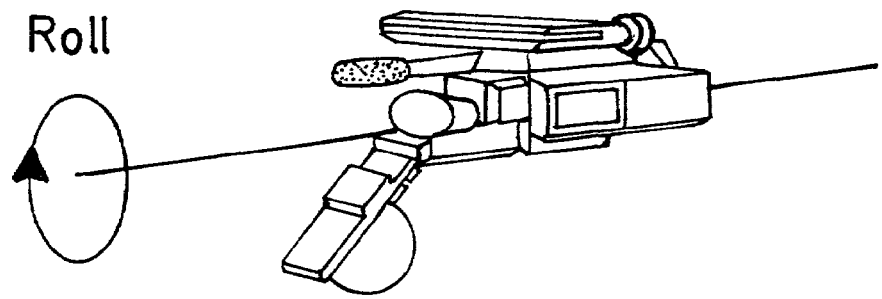
Figure 3:
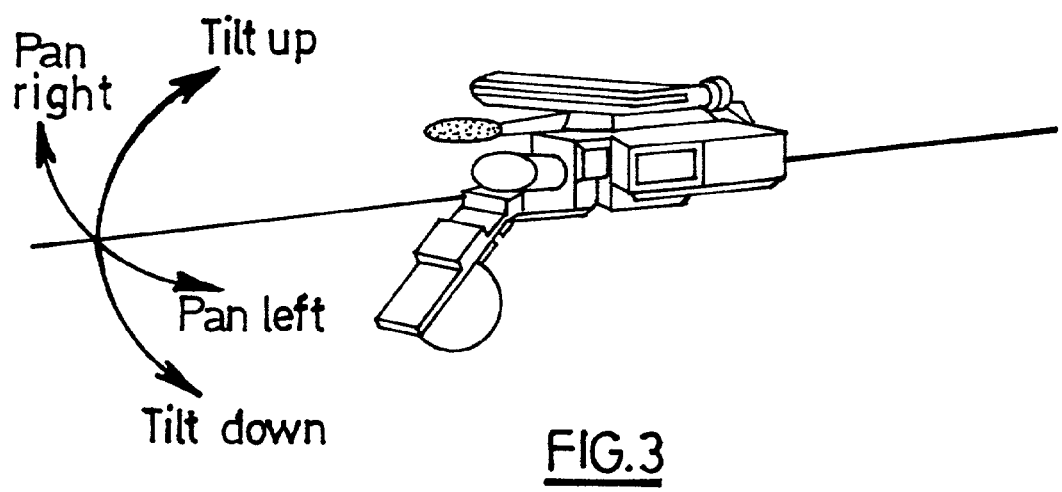

Considering these operations, a generic descriptor for camera motion should be able to characterize the feature "motion of the camera", i.e. to represent all those motion types independently, in order to handle every combination of them without any restriction. The scheme here described is compliant with this approach. Each motion type, except fixed camera, is oriented and can be subdivided into two components that stand for two different directions. Indeed, as shown in FIGS. 1 to 3, panning and tracking can be either left or right, tilting and booming can be either up or down, zooming can be in or out, dollying can be forward or backward and rolling can be either left (direct sense) or right (reverse sense). The distinction between the two possible directions therefore allows to use always positive values for the 15 motion types and to represent them in a way similar to a histogram.

The case of an instantaneous motion is first considered. Each motion type is assumed to be independent and to have its own speed, which will be described in a unified way. As the local speed induced by each motion type can depend on the scene depth (in the case of translations) or on the image point location (in the case of zooming, dollying and rotations), a common unit has been chosen to represent it. A speed will be represented by a pixel/frame value in the image plane, which is close to the human speed perception. In case of translations, the motion vectors magnitude is to be averaged on the whole image, because the local speed depends on the objects depth. In case of rotations like panning or tilting, the speed will be the one induced at the centre point of the image, where there is no distortion due to side effects. In case of zooming, dollying or rolling, the motion vectors field is divergent (more or less proportional to the distance to the image centre) and the speed will then be represented by the pixel displacement of the image corners.

Each motion type speed being represented by a pixel-displacement value, so as to meet the efficiency requirements, it is proposed to work at the half-pixel accuracy. As a consequence, in order to work with integer values, speeds will always be rounded to the closest half-pixel value and multiplied by 2. Given these definitions, any instantaneous camera motion can be represented by a histogram of the motion types in which the values correspond to half-pixel displacements (it is obvious that the FIXED field makes no sense in terms of speed: this is the reason why a specific data type is required, in which FIXED is removed).

The case of a long-term representation of the camera motion has also to be considered. Indeed, working only with descriptions of instantaneous movements would be very heavy and time-consuming. It is also proposed, here, to define a description more or less hierarchical, that is to say handling the representation of the camera motion at any temporal granularity. Given a temporal window of the video data $[n_0, n_0+N]$ (N is the total number of frames of the window), it is supposed that the speeds of each motion type for each frame are known. It is then possible to compute the number of frames N(motion_type) in which each motion type has a non-zero magnitude and to represent the temporal presence by a percentage, defined as follows (e.g. for a panning movement):

$$T(panning) = \frac{N(panning)}{N} \quad (1)$$

such an expression being generalized to any type of motion. The temporal presence of all the possible camera motions would then be represented by a Motion TypesHistogram in which the values, between 0 and 100, correspond to a percentage. Obviously, if the window is reduced to a single frame, the values can only be 0 or 100, depending on the fact that the given movement is present or not in the frame.

Finally, in order to directly access the represented video data and to allow efficient comparisons between descriptors, it is proposed to add to the description the temporal boundaries that define the window being described, which can be either a entire video sequence, a shot (a shot is a sequence of frames in which there is no discontinuity and therefore allows for instance to have a natural index when dividing a video sequence into coherent temporal elements), a microsegment (which is part of a shot) or a single frame. The speeds correspond to the instantaneous speeds averaged on the whole temporal window (when the given motion type is present).

The above-defined proposal of descriptor allows to describe any camera motion of a given sequence of frames, by means of its starting point, its ending point, the temporal presence of each motion type (expressed in percentage), and the speed magnitude, expressed in a unified unit (½ pixel/frame). The main fundaments and advantages of this descriptor are its genericity (the CameraMotion descriptor takes into account all the physical possible movements in all the possible directions), its precision (the precision for the magnitude of any camera movement being described is half-a-pixel, which is sufficient even for professional applications), and its flexibility, since the CameraMotion descriptor can be associated to a wide range of temporal granularity, from the single frame to the whole video sequence (it can also be associated to successive time periods).

Moreover, all the requirements and evaluation criteria taken from the official MPEG-7 documents are shown to be satisfied by the camera motion description proposed, especially visual requirements. It is indeed specified, in the MPEG-7 requirements, that:

(a) MPEG-7 shall at least support visual descriptions of the feature "motion" (in case of requests for retrievals using temporal composition information)", which is obviously the case;

and also that:

(b) "MPEG-7 shall a support a range of multimedia data description with increasing capabilities in terms of visualization, so that MPEG-7 may allow a more or less sketchy visualization of the indexed data": the feature targeted by the proposed descriptor, namely the camera motion, is related to "motion", and, as far as visualization is concerned, one can imagine to textually or graphically represent the camera operations to obtain a kind of summary of the global motion of the video (for instance inside a story board).

Concerning visual data formats and classes, it is also specified, in the MPEG-7 requirements, that:

(c) "MPEG-7 shall support the description of the following visual data formats: digital video and film (such as MPEG-1, MPEG-2, MPEG4), analog video and film, still pictures (such as JPEG), graphics (such as CAD), tridimensional models (such as VRML), composition data associated to video, etc, . . . ", which is indeed the case since the present proposal, being related to the video content itself, targets all the video data formats, digital as well as analog, even if the automatic extraction of motion data can be easier on digital compressed video data, in which motion information is already included in the content (e.g. the motion vectors in MPEG-1, MPEG-2 and MPEG-4 format);

(d) "MPEG-7 shall support descriptions specifically applicable to the following classes of visual data: natural video, still pictures, graphics, bidimensional animation, three-dimensional models, composition information", which is also verified since the proposal may be applied to any animated visual data like natural video, animations or cartoons.

The MPEG-7 requirements also relate to other general features, such as:

(e) abstraction levels for multimedia material: the proposed solution is generic and can be used inside a hierarchical scheme allowing to represent the camera motion in a wide range of temporal granularity (the different abstraction levels that may thus be represented are the global motion types and magnitudes of an entire sequence, a video shot, a micro-segment within a shot, or even a single frame);

(f) cross-modality: queries based on visual descriptions can allow the retrieval of features completely different from the visual content (for instance audio data), or different particular features of said visual content (knowing that a close-up of an object is likely to be preceded by a zoom, or that a shot of a landscape generally involves a pan, the use of camera motion descriptors may help in case of searches in which different types of features are involved);

(g) feature priorities: a prioritisation of the information included in the descriptor allows the matching function (when the query parameters have been defined) to have numerous meanings that strongly depend on the preferences and requirements of the user;

(h) feature hierarchy: although the camera motion description is not designed following a hierarchical scheme, it is possible, for a more efficient processing of the data in terms of query, to construct different levels of description, for example to represent the motion of a video scene, inside which each shot is also described, and so forth recursively until the frame level is reached;

(i) description of temporal range: the camera motion descriptor can be associated to different temporal ranges of the video material (from the whole video—e.g. this particular film has been shot using always a fixed camera—to the frame level, allowing a very fine description) or to successive time periods like different microclusters within a shot (for instance: this shot begins with a long zoom of 20 seconds and ends with a short tilt of 2 seconds), said association being therefore either hierarchical (the descriptor is associated to the whole data or to a temporal sub-set of it) or sequential (the descriptor is associated to successive time periods);

(j) direct data manipulation: it is allowed by the present proposal.

Moreover, it is clear that functional requirements must also be reached by the proposal descriptor, and for instance (k) content-based retrieval: one of the main goals of the present proposal is indeed to allow an effective ("you get exactly what you are looking for" and efficient ("you get what you are looking for, quickly") retrieval of multimedia data based on their contents, whatever the semantic involved, the effectiveness being mainly guaranteed by the preciseness of the description, that takes into account independently all the possible motion operations and magnitudes involved, and the efficiency being dependent of the database engine used ant the retrieval strategy chosen;

(l) similarity-based retrieval: such a retrieval and the ranking of the database content by the degree of similarity are possible with the descriptor according to the invention;

(m) streamed and stored descriptions: nothing in the proposed descriptor prevents from carrying out said operations;

(n) referencing analog data: once gain, there is no limitation, in the proposed descriptor, for referencing objects, time references or any other data of analog format;

(o) linking: the proposed descriptor allows the precise locating of the referenced data, since the time instants defining the temporal window during which the description is valid are included in said description.

The descriptor thus proposed must be constructed on the basis of motion parameters previously defined. Although some techniques already exist for the estimation of these motion parameters (of the camera or of the concerned observing device), they often suffer of drawbacks leading to prefer an improved method for the estimation of camera motion parameters, such as described in the international patent application filed on Dec. 24, 1999, under the reference PCT/EP99/10409 (PHF99503).

Figure 4:
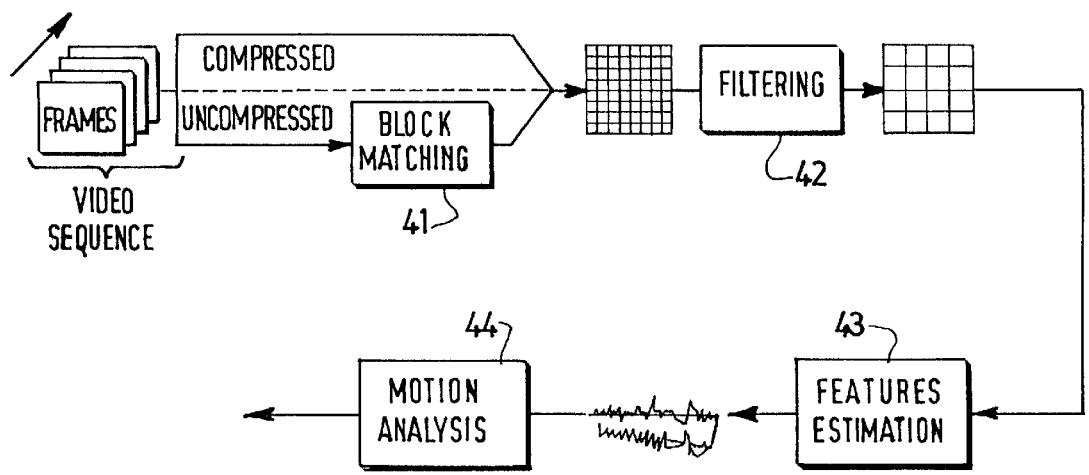
FIG. 4 gives an overview of a complete camera motion analysis system carrying out an estimation method for an instantaneous estimation of the camera features.

A global scheme of an implementation of this estimation method is illustrated in FIG. 4. It may be noted that, since MPEG-7 will be a multimedia content description standard, it does not specify a particular coding type: a process of descriptors formation must therefore work on all types of coded data, either compressed or uncompressed. Nevertheless, as most of the video data obtained from the input frames are generally available in the MPEG format (they are therefore compressed), it is advantageous to use directly the motion vectors provided by the MPEG motion compensation. On the contrary, if the video data are available in the uncompressed domain, a block-matching method is therefore implemented in a motion vector generation device 41, in order to obtain said vectors.

Whatever the case, once motion vectors have been read or extracted from the video sequence (between two successive frames), a downsampling and filtering device 42 is provided, in order to reduce the amount of data and the heterogeneousness of said motion vectors. This operation is followed by an instantaneous estimation, in a device 43, of the camera features. This estimation is for instance based on the following method.

Figure 5:
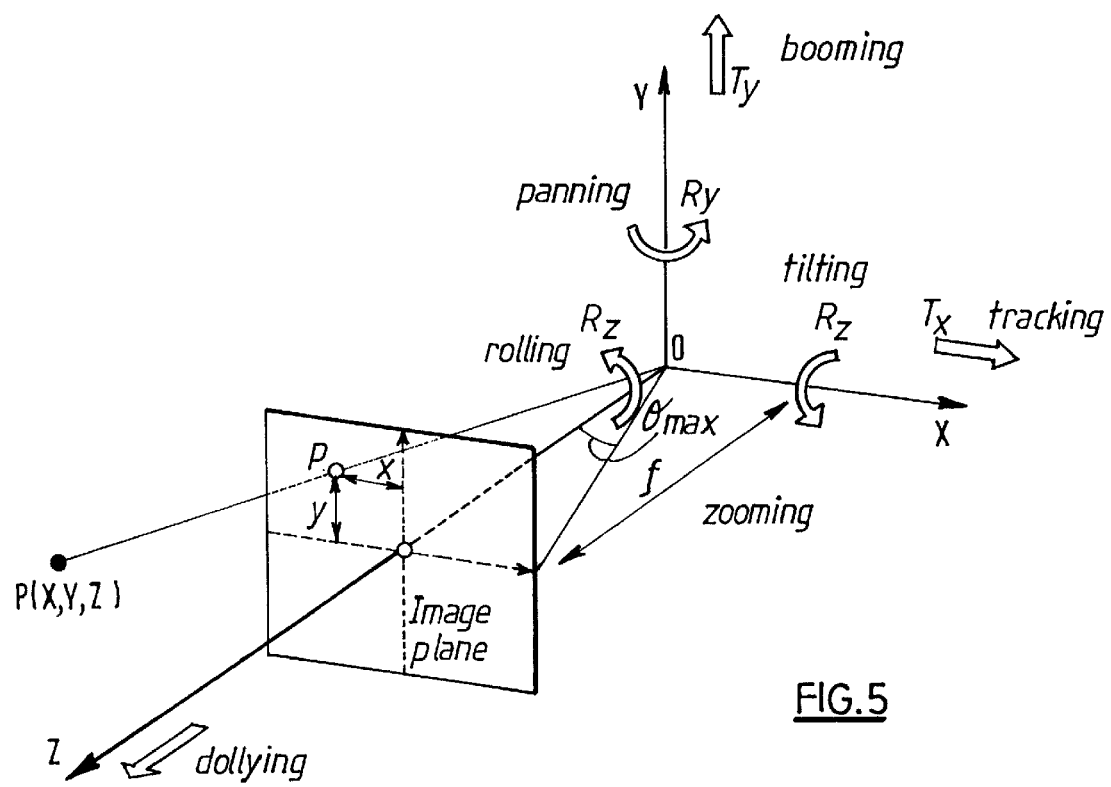
FIG. 5 is a perspective projection illustrating for a camera an external coordinates system 0XYZ moving with the camera and shows, for a focal length f, both the retinal coordinates (x,y) corresponding to a point P in the tridimensional scene and the different camera motion parameters.

Before describing this method, the camera model used is presented. A monocular camera moving through a static environment is considered. As can be seen in FIG. 5, let 0 be the optical centre of the camera and OXYZ an external coordinates system that is fixed with respect to the camera, OZ being the optical axis and x,y, z being respectively the horizontal, vertical and axial directions. Let $T_x$, $T_y$, $T_z$ be the translational velocity of OXYZ relative to the scene and $R_x$, $R_y$, $R_z$ its angular velocity. If (X,Y,Z) are the instantaneous coordinates of a point P in the tridimensional scene, the velocity components of P will be:

$$\overline{X} = -T_x - R_y Z + R_z Y \tag{2}$$

$$\overline{Y} = -T_y - R_z X + R_x Z \tag{3}$$

$$\overline{Z} = -T_z - R_x Y + R_y X \tag{4}$$

The image position of P, namely p, is given in the image plane by the relation (5): (x,y)=internal coordinates=

$$\left( f\frac{X}{Z}, f\frac{Y}{Z} \right) \tag{5}$$

(where f is the focal length of the camera), and will move across the image plane with an induced velocity:

$$(u_x, u_y) = (\overline{x}, \overline{y}) \tag{6}$$

After some computations and substitutions, the following relations are obtained:

$$u_x = f \cdot \frac{X}{Z} - f \cdot \frac{X \cdot \bar{Z}}{Z^2} \qquad (7)$$

$$u_x = \frac{f}{Z}(-T_x - R_y \cdot Z + R_z \cdot Y) - \frac{f \cdot X}{Z^2}(-T_z - R_x \cdot Y + R_y \cdot X) \qquad (8)$$

and:

$$u_y = f \cdot \frac{Y}{Z} - f \cdot \frac{Y \cdot \bar{Z}}{Z^2} \qquad (9)$$

$$u_x = \frac{f}{Z}(-T_y - R_y \cdot X + R_x \cdot Z) - \frac{f \cdot X}{Z^2}(-T_z - R_x \cdot Y + R_y \cdot X) \qquad (10)$$

which can also be written:

$$u_x(x,y) = -\frac{f}{Z} \cdot (T_x - x \cdot T_z) + \frac{x \cdot y}{f} \cdot R_x - f\left(1 + \frac{x^2}{f^2}\right) R_y + y \cdot R_z \qquad (11)$$

$$u_y(x,y) = -\frac{f}{Z} \cdot (T_y - y \cdot T_z) + \frac{x \cdot y}{f} \cdot R_y - f\left(1 + \frac{y^2}{f^2}\right) R_x - x \cdot R_z \qquad (12)$$

Moreover, in order to include the zoom in the camera model, it is assumed that a zoom can be approximated by a single magnification in the angular domain. Such an hypothesis is valid if the distance of the nearest object in the scene is large compared to the change of focal length used to produce the zoom, which is usually the case.

Figure 6:
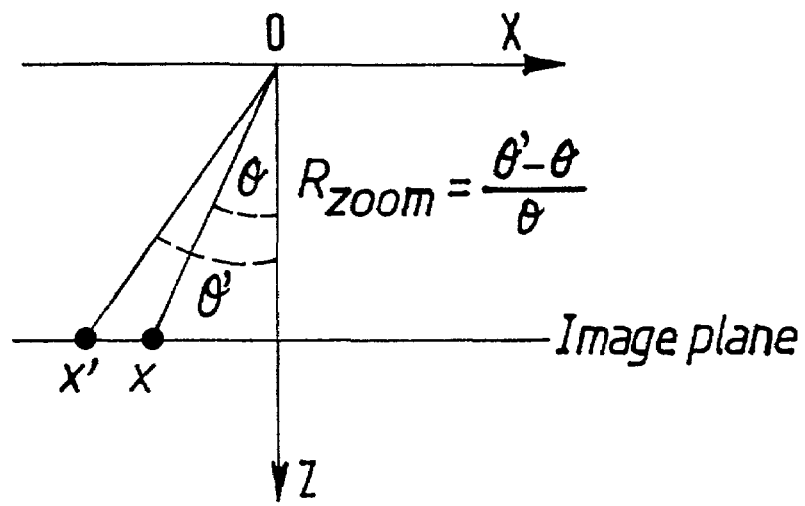
FIG. 6 illustrates a zoom model included in the camera model.

A pure zoom is considered in FIG. 6. Given a point located in the image plane, on (x,y) at a time t and on (x', y') at the next time t', the image velocity $U_x$=x'−x along x induced by the zoom can be expressed as a function of $R_{zoom}$ ($R_{zoom}$ being defined by the relation (''−θ)/θ, as indicated in FIG. 6), as shown below.

One has indeed: tan (θ')=x'/f and tan (θ)=x/f, which leads to:

$$u_x = x' - x = [\tan(\theta') - \tan(\theta)] \cdot f \qquad (13)$$

The expression of tan (θ') can be written:

$$\tan(\theta') = \tan[(\theta' - \theta) + \theta] = \frac{\tan(\theta' - \theta) + \tan(\theta)}{1 - \tan(\theta) \cdot \tan(\theta' - \theta)} \qquad (14)$$

Assuming then that the angular difference (θ'−θ) is small, i.e. tan (θ'−θ) can be approximated by (θ'−θ), and that (θ'−θ).tan θ<<1, one obtains:

$$u_x = x' - x = f \cdot \left[\frac{(\theta' - \theta) + \tan(\theta)}{1 - (\theta' - \theta) \cdot \tan\theta} - \tan\theta\right] \qquad (15)$$

$$u_x = f \cdot \frac{(\theta' - \theta) \cdot (1 + \tan^2(\theta))}{1 - (\theta' - \theta) \cdot \tan\theta} \qquad (16)$$

$$u_x = f \cdot \theta \cdot R_{ZOOM} \cdot \frac{1 + \tan^2(\theta)}{1 - (\theta' - \theta) \cdot \tan\theta} \qquad (17)$$

which is practically equivalent to $$u_x = x' - x = f.\theta.R_{zoom}.(1 + \tan^2\theta) \qquad (18)$$

This result can be rewritten:

$$u_x = f \cdot \tan^{-1}\left(\frac{x}{f}\right) \cdot R_{zoom} \cdot \left(1 + \frac{x^2}{f^2}\right) \qquad (19)$$

and, similarly, $u_y$ is given by:

$$u_Y = f \cdot \tan^{-1}\left(\frac{y}{f}\right) \cdot R_{zoom} \cdot \left(1 + \frac{y^2}{f^2}\right) \qquad (20)$$

The velocity u=($u_x$, $u_y$) corresponds to the motion induced in the image plane by a single zoom. A general model in which all the rotations, translations (along X and Y axis) and zoom are taken into account can then logically be defined.

This general model can be written as the sum of a rotational velocity, representing rotational and zoom motions, and a translational velocity, representing the X and Y translations (i.e. tracking and booming respectively)

$$\begin{cases} u_x = u_x^{trans} + u_x^{rot} \\ u_y = u_y^{trans} + u_y^{rot} \end{cases} \qquad (21)$$

with:

$$\begin{cases} u_x^{trans} = -\frac{f}{Z} \cdot T_x \\ u_y^{trans} = -\frac{f}{Z} \cdot T_y \end{cases}$$

$$\begin{cases} u_x^{rot} = \frac{x \cdot y}{f} \cdot R_x - f \cdot \left(1 + \frac{x^2}{f^2}\right) \cdot R_y + y \cdot R_z + f \cdot \tan^{-1}\left(\frac{x}{f}\right) \cdot \left(1 + \frac{x^2}{f^2}\right) \cdot R_{zoom} \\ u_y^{rot} = -\frac{x \cdot y}{f} \cdot R_y + f \cdot \left(1 + \frac{y^2}{f^2}\right) \cdot R_x + x \cdot R_z + f \cdot \tan^{-1}\left(\frac{y}{f}\right) \cdot \left(1 + \frac{y^2}{f^2}\right) \cdot R_{zoom} \end{cases}$$

equations in which only translational terms depend on the object distance Z.

The article "Qualitative estimation of camera motion parameters from video sequences", by M. V. Srinivasan and al., Pattern Recognition, vol. 30, n°4, 1997, pp. 593–605, describes, for extracting camera motion parameters from a sequence of images, a technique using the camera equations (21) to (23). More precisely, the basic principle of this technique is explained in part 3 (pp. 595–597) of said article. The technique, implemented by finding the best values of $R_x$, $R_y$, $R_z$ and $R_{zoom}$ that create a flow field which, when subtracted from the original optic flow field, then results in a residual flow field wherein all the vectors are parallel, uses an iterative method minimizing deviations from parallelism of the residual flow vectors, by means of an advantageous sector-based criterion.

At each step of this iterative method, the optic flow due to the current camera motion parameters is calculated according to one of two different camera models. A first model assumes that the angular size of the visual field (or the focal length f) is known: this means that the ratios x/f and y/f in the equations (23) can be calculated for each point in the image, said equations then allowing to calculate the optic flow exactly. This first model, which is the one taking into account panning or tilting distorsions, produces more accurate results when the visual field of the camera is large and known. Unfortunately, the focal length is sometimes not known, which leads to use a second model, only on a restricted area of the image when the visual field is suspected to be large. According to said second model, small field approximations (x/f and y/f very lower than 1) are then necessary before applying the equation (23), which leads to the equations (24) and (25):

$$u_x^{rot} \square -f.R_y + y.R_z + x.R_{zoom} \quad (24)$$

$$u_y^{rot} \square -f.R_x - x.R_z + y.R_{zoom} \quad (25)$$

The estimation thus carried out in the device 43 leads to one features vector for each pair of frames. The set of features vectors within the whole considered sequence is then finally received by a long-term motion analysis device 44. This device 44 outputs motion descriptors which may be used to index the sequence in terms of camera motion in a content-based retrieval context, especially in the MPEG-7 video indexing framework.

Two main problems justify the preprocessing step in the device 42: the heterogeneousness of the motion vectors, above all in the low-frequency parts of the image or where texture is very homogeneous, and the too small size of the blocks. The downsampling and filtering process is provided for reducing the amount of vectors by downsampling the original field and simultaneously rejecting the vectors that are not consistant according to the 507 global information. A confidence mask, calculated for each vector, is used: it is a criterion varying between 0 and 1 according to the level of confidence of each motion vector and allowing to decide if the vectors are taken into account or not. An example of confidence mask may be to consider that for any theoretical camera motion, a motion vector cannot vary too much: close vectors have close values. One can then measure a confidence level according to the distance from each vector to its neighbourhood, which can be for instance represented by its average value or, preferably, its median (because it is less sensitive to big isolated errors). The confidence mask $C_{i,j}$ is therefore defined by the equation (26):

$$C_{ij} = e^{-\|\vec{v}_{i,j} - \vec{v}_{median}\|^2} \quad (26)$$

Figure 7:
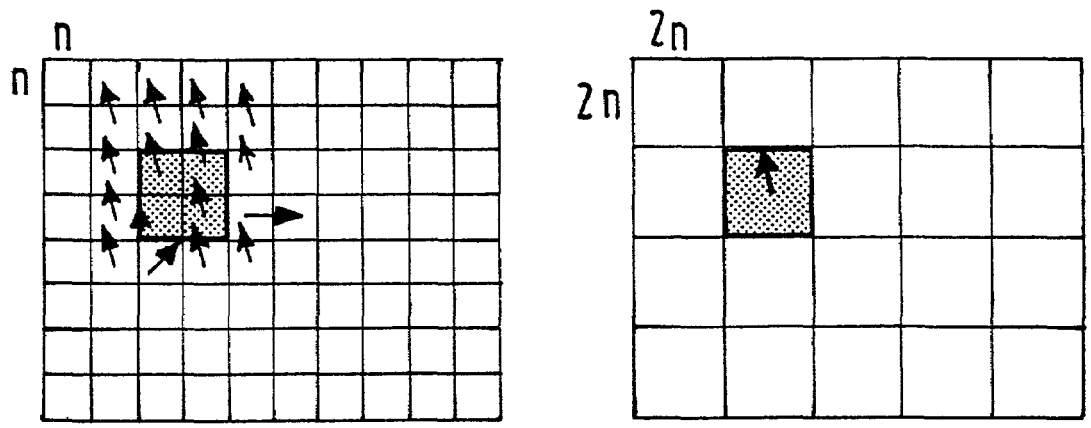
FIG. 7 illustrates a filtering technique used in the system of FIG. 4.

FIG. 7 illustrates the filtering technique: the filtered field (right side) contains four times as fewer blocks as the original field (left side). The vector representing the motion of a new block is computed according to the motion vectors of the four original blocks, and their confidence level is calculated according to the neighbourhood as indicated. The motion vector for the new block is the weighted mean of its old smaller blocks:

$$\vec{V}_{m,n}(\text{filt}) = \frac{\sum_{i=2(m-1)+1}^{2(m-1)+2} \sum_{j=2(n-1)+1}^{2(n-1)+2} C_{i,j} \cdot \vec{V}_{i,j}}{\sum_{i=2(m-1)+1}^{2(m-1)+2} \sum_{j=2(n-1)+1}^{2(n-1)+2}} \quad (27)$$

The device 43, provided for computing for each pair of frames, from the filtered motion vectors field, a feature vector that contains the camera motion information between the two considered frames, may also implement an estimation algorithm such as now detailed.

First, the confidence mask is computed, from the equation (26). Then the parallelisation process starts. Each time a motion vector is taken into account in the computation of the cost function or of the resultant vector, it is weighted by its confidence mask. The following equations then allow to compute the best values of $R_x$, $R_y$, $R_z$, $R_{zoom}$ and the focal length f that give a residual field in which all the vectors are parallel:

$$\vec{R}^{estim} = \lfloor \hat{R}_x, \hat{R}_y, \hat{R}_z, R_{zoom}, \hat{f} \rfloor = \operatorname{argmin}\{P(\hat{R})\} \quad (28)$$

$$\text{where } P(\vec{R}) = \sum_i \sum_j \|\vec{v}_{i,j}^{residual}(\vec{R})\|^2 \cdot \theta_{i,j} \cdot C_{i,j} \quad (29)$$

with:

$$\vec{v}_{i,j}^{residual}(\vec{R}) = \vec{v}_{i,j} - \begin{bmatrix} u_x^{rot}(\vec{R}) \\ u_x^{rot}(\vec{R}) \end{bmatrix} \text{ and} \quad (30)$$

$$\theta_{i,j} = \operatorname{angle}(\vec{v}_{i,j}^{residual}, \vec{V}^{residual}),$$

$$\vec{V}^{residual} = \frac{\sum_i \sum_j \vec{v}_{i,j}^{residual} \cdot C_{i,j}}{\sum_i \sum_j C_{i,j}} \quad (31)$$

In the case of a non-translational motion in a large visual field, the residual vectors would not be parallel but should ideally be close to zero. This remark leads to compute the β ratio given by the equation (32):

$$\beta = \frac{\|\sum \vec{v}_{i,j}^{residual}(\vec{R}^{estim})\|}{\sum \|\vec{v}_{i,j}^{residual}(\vec{R}^{estim})\|} \quad (32)$$

which indicates the parallelism of the residual field. This is the ratio of the magnitude of the resultant of the residual flow vectors to the sum of the magnitudes of the residual flow vectors: β=1 implies that the residual vectors are perfectly aligned, while β=0 implies that the residual vectors are randomly oriented with respect to each other. Moreover, to check the presence of a significant tracking component in the camera motion, the strength of the residual flow field is compared to that of the original flow field by computing the following ratio α, given by the equation (33):

$$\alpha = \frac{mean^{(*)}(\|\vec{v}_{i,j}^{residual}(\vec{R}^{estim})\|)}{mean^{(*)}(\|\vec{v}_{i,j}\|)} \quad (33)$$

The "mean(*)" operator represents the weighted mean of its arguments, according to the confidence mask. These two ratios allow to check for the presence and the amount of tracking components as shown below:

A) if β~0, no tracking motion;
B) if β~1:
if α~0, negligible tracking motion;
if α~1, significant tracking motion:
$\hat{T}_x = -V_x^{residual}$
$\hat{T}_y = -V_y^{residual}$ These ratios also give an idea of the results relevance.

It must be noted that the estimated components of translational motion, namely $\hat{T}_x$ and $\hat{T}_y$, do not represent exact components of the first model, but a weighted mean within the whole image of $$f \cdot \frac{T_x}{z}$$

and $$f \cdot \frac{T_y}{z},$$

since the depth of each block is not known. However, they are good representations of apparent tracking motion in the image.

Figure 8:
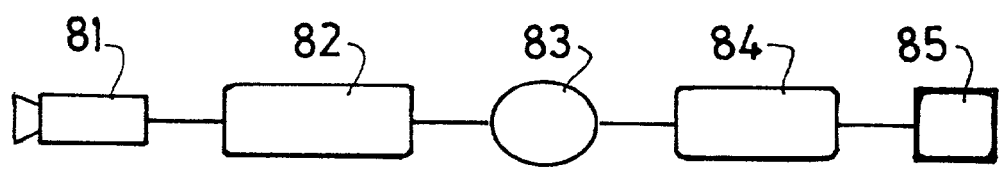
FIG. 8 illustrates an image retrieval system based on a categorization resulting from the use of the descriptor according to the invention.

The invention is not limited to the content of the previous description, from which modifications or applications may be deduced without departing from the scope of the invention. For instance the invention also relates to an image retrieval system such as illustrated in FIG. 8, comprising a camera 81, for the acquisition of the video sequences (available in the form of sequential video bitstreams), a video indexing device 82, for carrying out a data indexing method based on a categorization resulting from the use of said descriptor of motions (of a camera or of any observing device), a database 83 that stores the data resulting from said categorization (these data, sometimes called metadata, will allow the retrieval or browsing step then carried out on request by users), a graphical user interface 84, for carrying out the requested retrieval from the database, and a video monitor 85 for displaying the retrieved information.

The invention claimed is:

1. A descriptor, embodied within a computer-readable medium, said descriptor being configured to represent, from a video indexing viewpoint, motions of a camera or any kind of observer or observing device, said descriptor being configured for flexibility with respect to how many frames are to be retrieved from a database, and, in particular, to cover the case of one frame, configured to represent the motions within any one frame of a video sequence, and, to cover the case of more than one frame, configured to represent any series comprised of a plurality of frames of the video sequence, the motions represented in said descriptor comprising, for said any one frame and for said series, respectively, at least one of the following basic motion types: fixed, panning, tracking, tilting, booming, zooming, dollying and rolling, or any combination of two or more of these types, said descriptor being further configured such that each of said motions represented, except fixed, is oriented and subdivided, in the representation, into two components that stand for two different directions, magnitudes of the respective components each corresponding to a respective predefined size of displacement, the sizes being corresponding values of a dependent variable that defines a histogram for the descriptor, wherein the histogram has an independent variable with values that form pairs, each pair corresponding to a different one of said motion types and is configured according to the equation:

$$N_{type\ of\ motion} = N_{type\ of\ motion}/N$$

wherein the subscript "type of motion" represents the independent variable, N represents the number of the frames that are within a window, and $N_{type\ of\ motion}$ represents the number of frames within the window that have the one of the motion types represented by said subscript.

2. The descriptor of claim 1, wherein each motion type, assumed to be independent, has its own speed described, in said descriptor, in an unified way by choosing a common unit to represent it.

3. The descriptor of claim 2, in which each motion type speed is represented by a pixel-displacement value working at the half-pixel accuracy.

4. The descriptor of claim 3, in which, in order to work with integer values, speeds are rounded to the closest half-pixel value and multiplied by 2.

5. The descriptor of claim 4, wherein given a temporal window of the video sequence [$n_0$, $n_0$+N] (N is the total number of frames of the window) and the speeds of each motion type for each frame, the number of frames $N_{motion-type}$ in which each motion type has a significant speed is computed and the temporal presence is represented by a percentage, defined as follows:

$$T_{type\ of\ motion} = N_{type\ of\ motion}/N$$

the temporal presence of all the possible motions being then represented by a said histogram in which said values, between 0 and 100, correspond to a percentage, said values being only 0 or 100, depending on the fact that the given movement is present or not in the frame, when the window is reduced to a single frame.

6. The database of claim 4, configured to query said N frames of the database in response to said descriptor.

7. The descriptor of claim 1, wherein a description afforded by said descriptor is hierarchical, by means of a representation of the motion handled at any temporal granularity.

8. An image retrieval system comprising a camera for the acquisition of video sequences, a video indexing device, said database, a graphical user interface for carrying out a requested retrieval from said database, and a video monitor for displaying the retrieved information, an indexing operation within said video indexing device being based on categorization resulting from the use of said descriptor of claim 1.

9. The system of claim 8, wherein said retrieval is based on said descriptor serving as a query into the database.

10. A computer program product comprising a computer-readable medium having a computer program comprising a sequence of instructions for creating the descriptor of claim 1.

11. The product of claim 10, wherein the histogram has an independent variable with values that form pairs, each pair corresponding to a different one of said motion types.

12. The product of claim 1, wherein the histogram is configured according to the equation:

$$T_{type\ of\ motion} = N_{type\ of\ motion}/N$$

wherein the subscript "type of motion." represents the independent variable, N represents the number of the frames that are within a window, and $N_{type\ of\ motion}$ represents the number of frames within the window that have the one of the motion types represented by said subscript.

13. The descriptor of claim 1, wherein said descriptor, upon being utilized as a query into a database, includes a predetermined temporal window of the video data [$n_0$, $n_0+N$] is the total number of frames of the window).

14. The descriptor of claim 13, configured with flexibility as to a size of said window, so that, in said case of one frame, the window size is one, and, in said case of more than one frame, the window size is greater than one.

15. Said database of claim 1, configured to be queried by the descriptor of claim 1.

16. A video indexing device, configured to carry out a data indexing method based on a categorization that affords querying of said database by said descriptor of claim 1, said database storing data resulting from said categorization.

17. Tec descriptor of claim 1, formatted to comprise a starting point of said video sequence, an ending point of said video sequence, a temporal presence of each of said motion types, and a respective speed magnitude for each of said motion types.

18. The descriptor of claim 17, further formatted to be associated with successive time periods.

19. A method of querying the database of claim 1, comprising:
entering the descriptor of claim 1; and
providing the entered descriptor to said database to allow the retrieving from said database.

20. A descriptor, embodied within a computer-readable medium, said descriptor being configured to represent, from a video indexing viewpoint, motions of a camera or any kind of observer or observing device, said descriptor being configured for flexibility with respect to how many frames are to be retrieved from a database, and, in particular, to cover the case of one frame, configured to represent the motions within any one frame of a video sequence, and, to cover the case of more tan one frame, configured to represent any series comprised of a plurality of frames of the video sequence, said descriptor being further configured such that ones of said motions, said descriptor is configured to represent are each oriented and subdivided, in the representation, into two components that stand for two different directions, magnitudes of the respective components each corresponding to a respective predefined size of displacement, the sizes being corresponding values of a dependent variable that defines a histogram for the descriptor, wherein the histogram has an independent variable with values that form pairs, each pair corresponding to a different one of said motion types and is configured according to the equation:

$$T_{type\ of\ motion} = N_{type\ of\ motion}/N,$$

wherein the subscript "type of motion" represents the independent variable, N represents the number of the frames that are within a window, and $N_{type\ of\ motion}$ represents the number of frames within the window that have the one of the motion types represented by said subscript.

21. The descriptor of claim 20, wherein each motion type, assumed to be independent, has its own speed described, in said descriptor, in a unified way by choosing a common unit to represent it.

22. An image retrieval system comprising a camera for the acquisition of video sequences, a video indexing device, said database, a graphical user interface for carrying out a requested retrieval from said database, and a video monitor for displaying the retrieved information, an indexing operation within said video indexing device being based on categorization resulting from the use of said descriptor of claim 20.

23. The descriptor of claim 20, wherein the histogram has an independent variable with values that form pairs, each pair corresponding to a different one of said motion types.

24. A computer program product comprising a computer-readable medium having a computer program comprising a sequence of instructions for creating the descriptor of claim 20.

25. The descriptor of claim 20, wherein said descriptor, upon being utilized as a query into a database, includes a predetermined temporal window of the video data [$n_0$, $n_0+N$] (N is the total number of frames of the window).

26. Said database of claim 20, configured to be queried by the descriptor of claim 20.

27. A video indexing device, configured to carry out a data indexing method based on a categorization that affords querying of said database by said descriptor of claim 20, said database storing data resulting from said categorization.

28. The descriptor of claim 20, formatted to comprise a starting point of said video sequence, an ending point of said video sequence, a temporal presence of each of said motion types, and a respective speed magnitude for each of said motion types.

29. A method of querying the database of claim 20, comprising:
entering the descriptor of claim 20; and
providing the entered descriptor to said database to allow the retrieving from said database.

* * * * *